(12) United States Patent
Grushkowitz

(10) Patent No.: US 9,279,457 B2
(45) Date of Patent: Mar. 8, 2016

(54) NESTED TORQUE TUBES FOR PHOTOVOLTAIC TRACKING SYSTEMS

(71) Applicant: SunPower Corporation, San Jose, CA (US)

(72) Inventor: Tyler Grushkowitz, Hayward, CA (US)

(73) Assignee: SunPower Corporation, San Jose, CA (US)

( * ) Notice: Subject to any disclaimer, the term of this patent is extended or adjusted under 35 U.S.C. 154(b) by 107 days.

(21) Appl. No.: 13/842,131

(22) Filed: Mar. 15, 2013

(65) Prior Publication Data

US 2014/0270930 A1 Sep. 18, 2014

(51) Int. Cl.
*F16D 1/033* (2006.01)

(52) U.S. Cl.
CPC ............ *F16D 1/033* (2013.01); *Y10T 403/645* (2015.01)

(58) Field of Classification Search
CPC ........ F16D 1/033; F16D 1/076; F16L 23/036; F16L 3/23; F24J 2/526; F24J 2002/5279; B60P 7/12
USPC .................. 403/337, 387, 389; 285/368, 412; 410/36, 42, 47, 49
See application file for complete search history.

(56) References Cited

U.S. PATENT DOCUMENTS

| | | | | | |
|---|---|---|---|---|---|
| 1,316,381 | A | * | 9/1919 | Murray | 285/416 |
| 1,805,990 | A | * | 5/1931 | Makowski | 285/188 |
| 1,810,142 | A | * | 6/1931 | Makowski | 285/61 |
| 2,849,027 | A | * | 8/1958 | Tetyak | 138/112 |
| 4,244,542 | A | * | 1/1981 | Mathews | 248/49 |
| 4,306,697 | A | * | 12/1981 | Mathews | 248/68.1 |
| 4,506,796 | A | * | 3/1985 | Thompson | 211/59.4 |
| 4,572,716 | A | * | 2/1986 | West | 410/36 |
| 4,643,457 | A | * | 2/1987 | Press | 285/55 |
| 5,516,244 | A | * | 5/1996 | Baka | 410/36 |
| 5,605,419 | A | * | 2/1997 | Reinert, Sr. | 405/154.1 |
| 5,735,412 | A | * | 4/1998 | Sheckells | 211/59.4 |

(Continued)

FOREIGN PATENT DOCUMENTS

| | | |
|---|---|---|
| JP | 05-032265 | 2/1993 |
| JP | 10-236515 | 9/1998 |

(Continued)

OTHER PUBLICATIONS

U.S. Appl. No. 13/176,276, filed Jul. 5, 2011, Cole et al.

(Continued)

*Primary Examiner* — Joshua Kennedy
(74) *Attorney, Agent, or Firm* — Knobbe, Martens, Olson & Bear LLP

(57) ABSTRACT

A sun tracking solar energy collection system can include torque tubes that can be configured to allow the cylindrical body of one torque tube to nest with projections extending from an adjacent torque tube. The torque tubes can be formed with a plurality of rotatable shafts connected to each other in an end to end fashion. The torque tubes may be connected with coupling flanges, shaped with a plurality of radially extending lobes. The coupling flanges can include a plurality of concave portions disposed between adjacent lobes. The rotatable shafts can be round and the concave portions can be curved with a radius of curvature that is about the same as a radius of curvature of outer surface of the rotatable shafts. The torque tubes can also have saddle mounts which can include a concave portion configured to nest with an adjacent torque tube.

18 Claims, 11 Drawing Sheets

(56) References Cited

U.S. PATENT DOCUMENTS

| | | | |
|---|---|---|---|
| 6,200,223 B1 * | 3/2001 | Martens | 464/99 |
| 6,572,313 B2 * | 6/2003 | Porto | 410/42 |
| 7,361,092 B2 * | 4/2008 | Pawlowski et al. | 464/23 |
| 7,942,371 B1 * | 5/2011 | Mccoy | 248/68.1 |
| 2008/0053928 A1 | 3/2008 | Klauer | |
| 2008/0245360 A1 | 10/2008 | Almy et al. | |
| 2010/0071744 A1 | 3/2010 | Peurach et al. | |
| 2012/0180845 A1 * | 7/2012 | Cole et al. | 136/246 |
| 2014/0090637 A1 * | 4/2014 | Grushkowitz | 126/600 |

FOREIGN PATENT DOCUMENTS

| | | |
|---|---|---|
| JP | 2002-249166 | 9/2002 |
| WO | WO2011-048427 | 4/2011 |

OTHER PUBLICATIONS

U.S. Appl. No. 13/631,782, filed Sep. 28, 2012, Grushkowitz.

PCT International Search Report and Written Opinion for PCT/US2014/021029 dated Jun. 17, 2014.

* cited by examiner

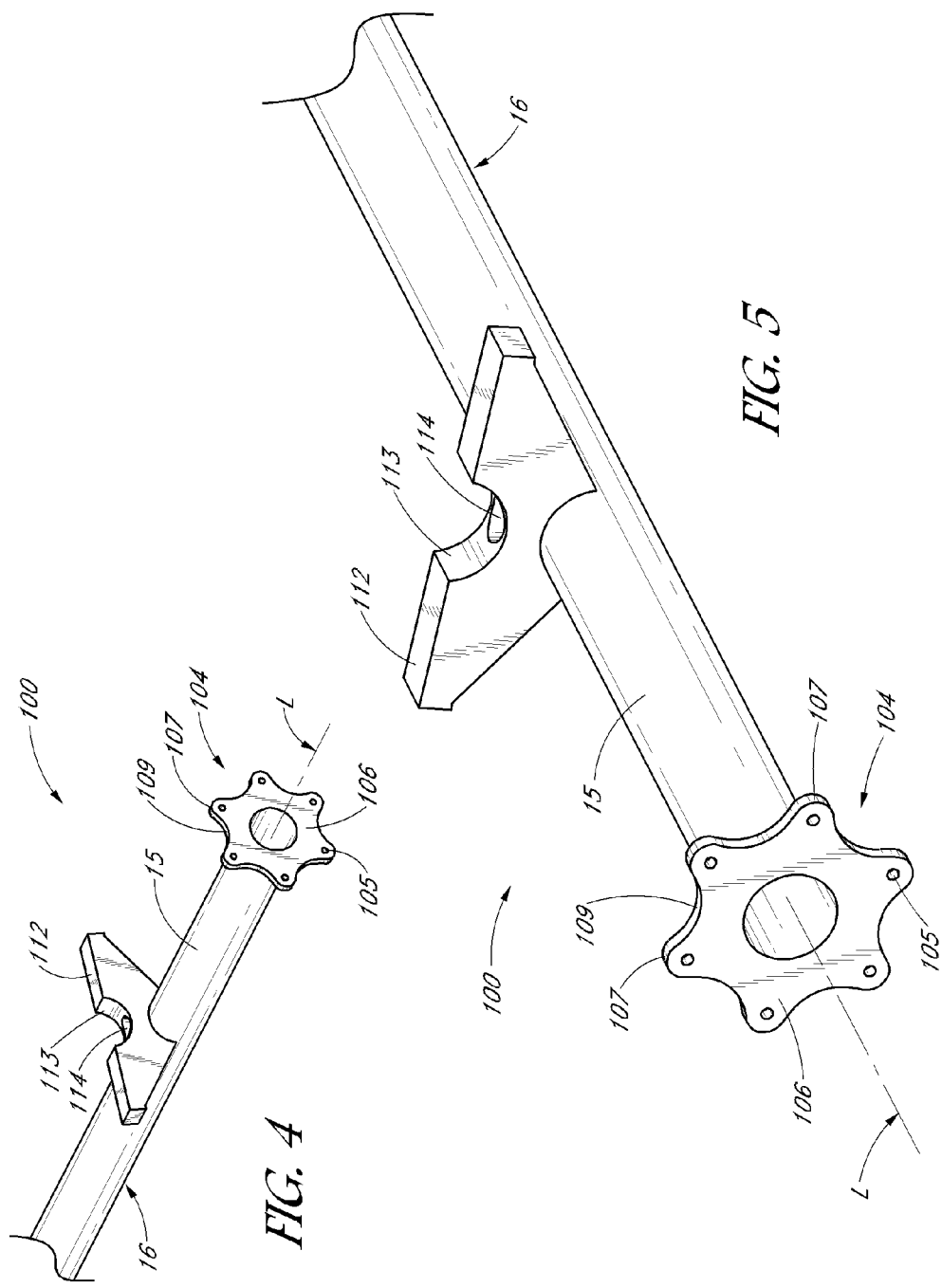

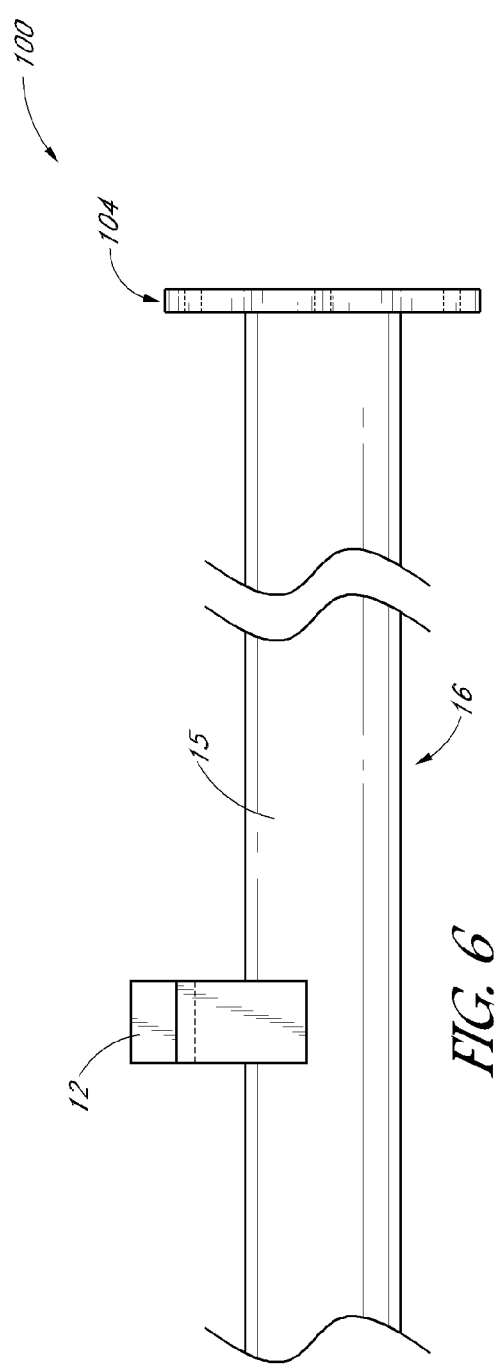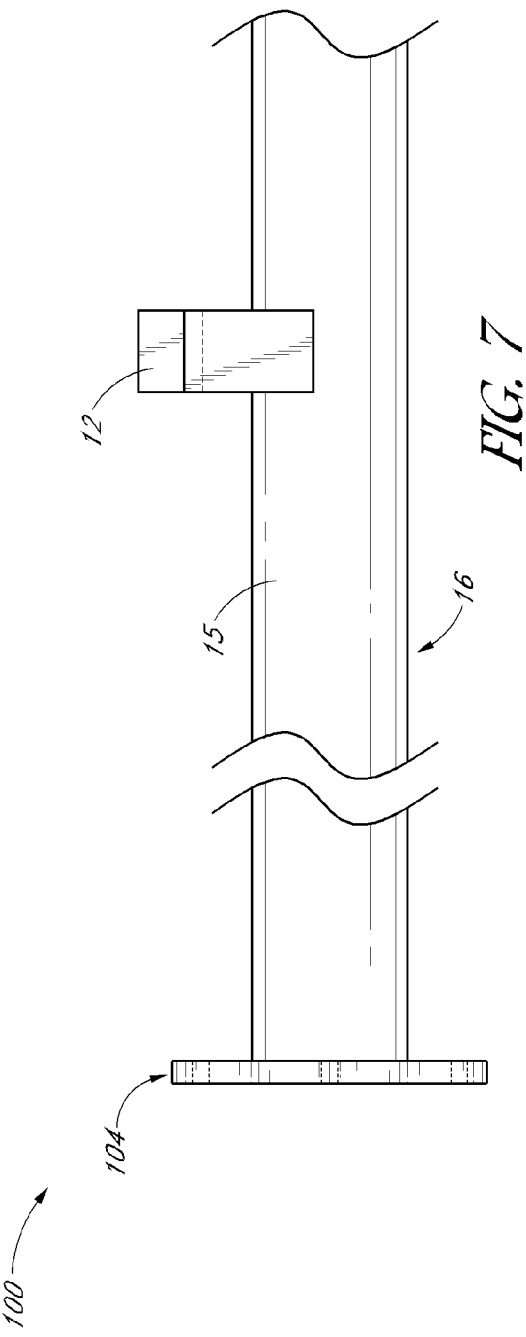

US 9,279,457 B2

NESTED TORQUE TUBES FOR PHOTOVOLTAIC TRACKING SYSTEMS

TECHNICAL FIELD

Embodiments of the subject matter described herein relate generally to components of rotatable shafts, such as components for connecting shafts together and for mounting other devices to the shafts. More particularly, embodiments of the subject matter relate to components of rotatable shafts used in photovoltaic solar power systems.

BACKGROUND

Some known sun tracking photovoltaic solar power systems, such as utility-scale, photovoltaic installations, are designed to pivot a large number of solar modules so as to track the movement of the sun using the fewest possible number of driver motors. For example, some known systems include parallel rows of photovoltaic modules supported on torque tubes. The torque tubes can comprise a number of long, round shafts connected together in an end to end fashion, typically fabricated out of metal. Existing torque tubes consist of welded saddles mounting photovoltaic modules along the length of the shaft, and coupling flanges at one or both ends of the shaft.

Pre-fabricated torque tubes are often used to improve reliability, quality, and ease of installation. However, existing pre-fabricated torque tube designs have also resulted in a low density shipping arrangement due to an increased amount of packaging material used to protect the torque tubes from unintended movement or damage during storage and transportation. Wood, or other rigid weight-bearing materials, such as planks or blocks serve not only as a packaging material, but also help stabilize stacks of round torque tubes for more efficient storage and transportation.

BRIEF SUMMARY

This application describes the structure of torque tubes, which at least consist of a cylindrical body having a long axis and a substantially circular cross-sectional shape. In some embodiments, the torque tubes have features to allow attachment to torque transmission members, including a motor or other torque tubes, and also features for solar collector device support. In other embodiments, the torque tubes also include features for improved shipping density and consequently lower shipping cost in volume-constrained shipping methods.

In one such embodiment, the torque tube can have at least one metal coupling flange welded to an end of the round torque tube, having a central region having a substantially circular shape with a center. In some other embodiments, the coupling flange also comprises a plurality of lobes extending from the central region, with the plurality of lobes directed outward radially from the center of the central region and evenly distributed around the central region. In some embodiments, the lobes are described as each having a tapering width with increasing radial distance outwards from the center, connected to two adjacent lobes with a curved portion. In some embodiments, the curved portion has a radius of at least the radius of the circular cross-section of the torque tube, thus allowing for the torque tubes to rest upon each other during shipping and transport.

In another embodiment, the torque tube has a cylindrical body of a substantially circular cross sectional shape with a center having a first radius of curvature, with at least one coupling flange coupled to the ends of the cylindrical body. The coupling flange comprises a plurality of lobes extending radially outward from the center of the cylindrical body, the plurality of lobes evenly distributed around the substantially circular cross-sectional shape of the cylindrical body and having a curved portion extending between and connecting two adjacent lobes with a substantially smooth surface with the first radius of curvature.

In yet another embodiment, the torque tube has at least one coupling flange and also a saddle mount feature, both of which have a concave portion with the same first radius of curvature, aligned so that the center of the first radii of curvature for both the coupling flange and the saddle mount feature are parallel with the axis of the torque tube.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 is a perspective view of an embodiment including a torque tube with features for improved shipping density such as a lobed coupling flange and a saddle mount solar collector device support;

FIG. 5 is a perspective view of one end of a torque tube with a lobed coupling flange and a saddle mount solar collector device support spaced apart from the coupling flange;

FIGS. 6 and 7 are is a side elevational views of the torque tube illustrated in FIG. 5;

DETAILED DESCRIPTION

Figure 1:
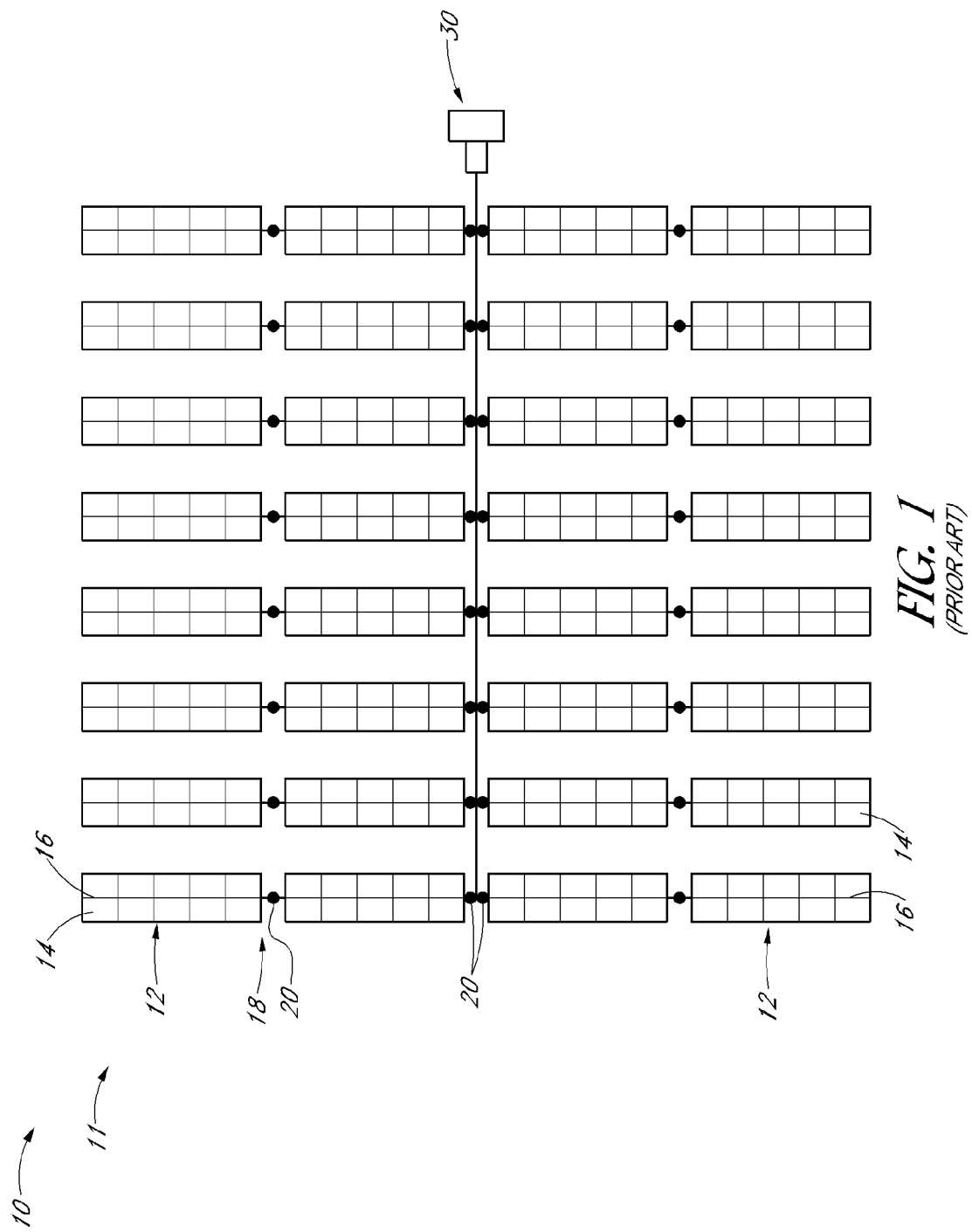
FIG. 1 is a schematic diagram of a prior art sun tracking photovoltaic system, with which the present inventions can be used.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 4 depicts one exemplary arrangement of elements, additional intervening elements, devices, features, or components may be present in an embodiment of the depicted subject matter.

The inventions disclosed herein are described in the context of non-concentrated and concentrated photovoltaic arrays and modules. However, these inventions can be used in other contexts as well, such as concentrated thermal solar systems, etc.

Figure 2:
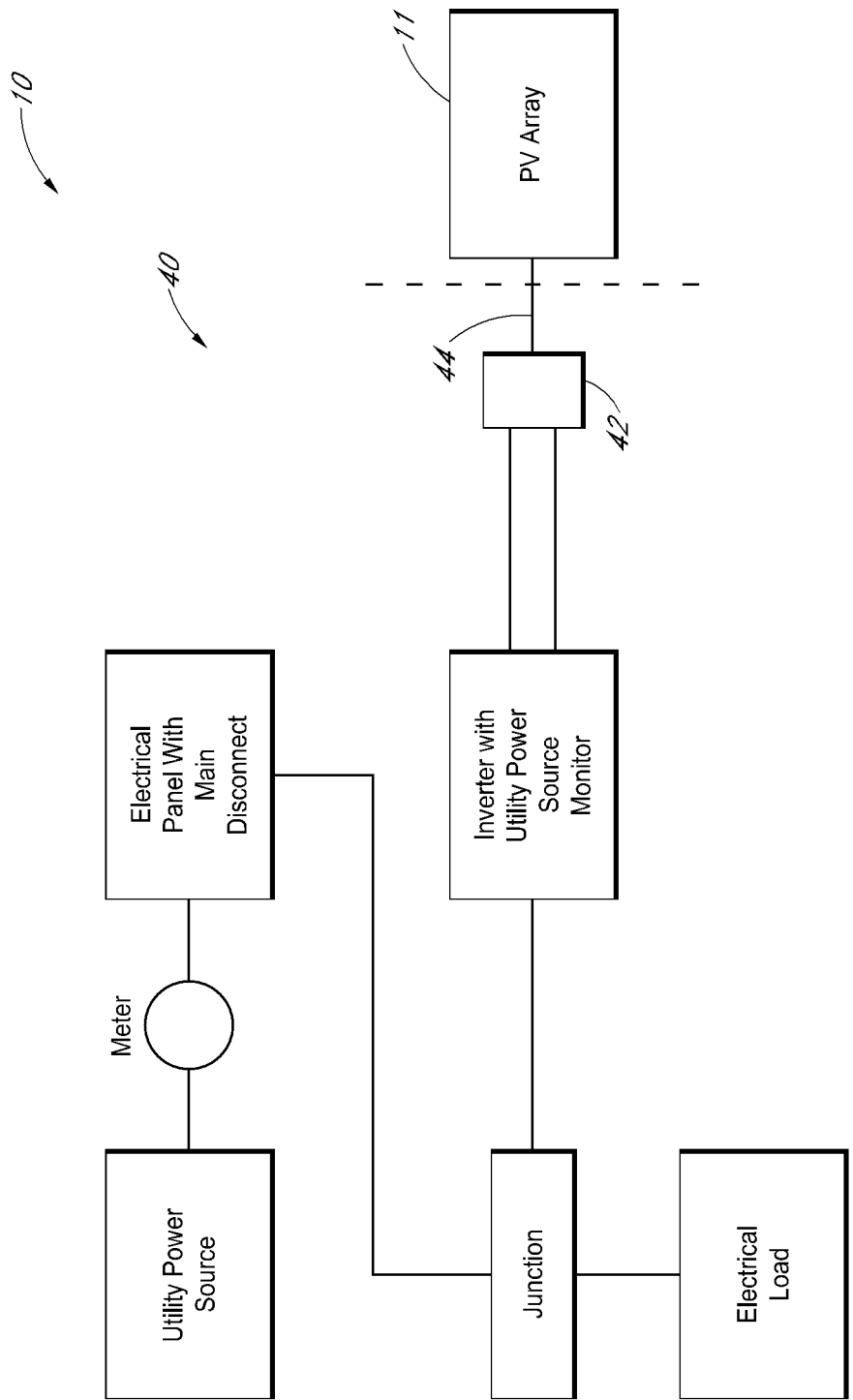
FIG. 2 is a schematic diagram of an electrical system for the photovoltaic system of FIG. 1.
Figure 3:
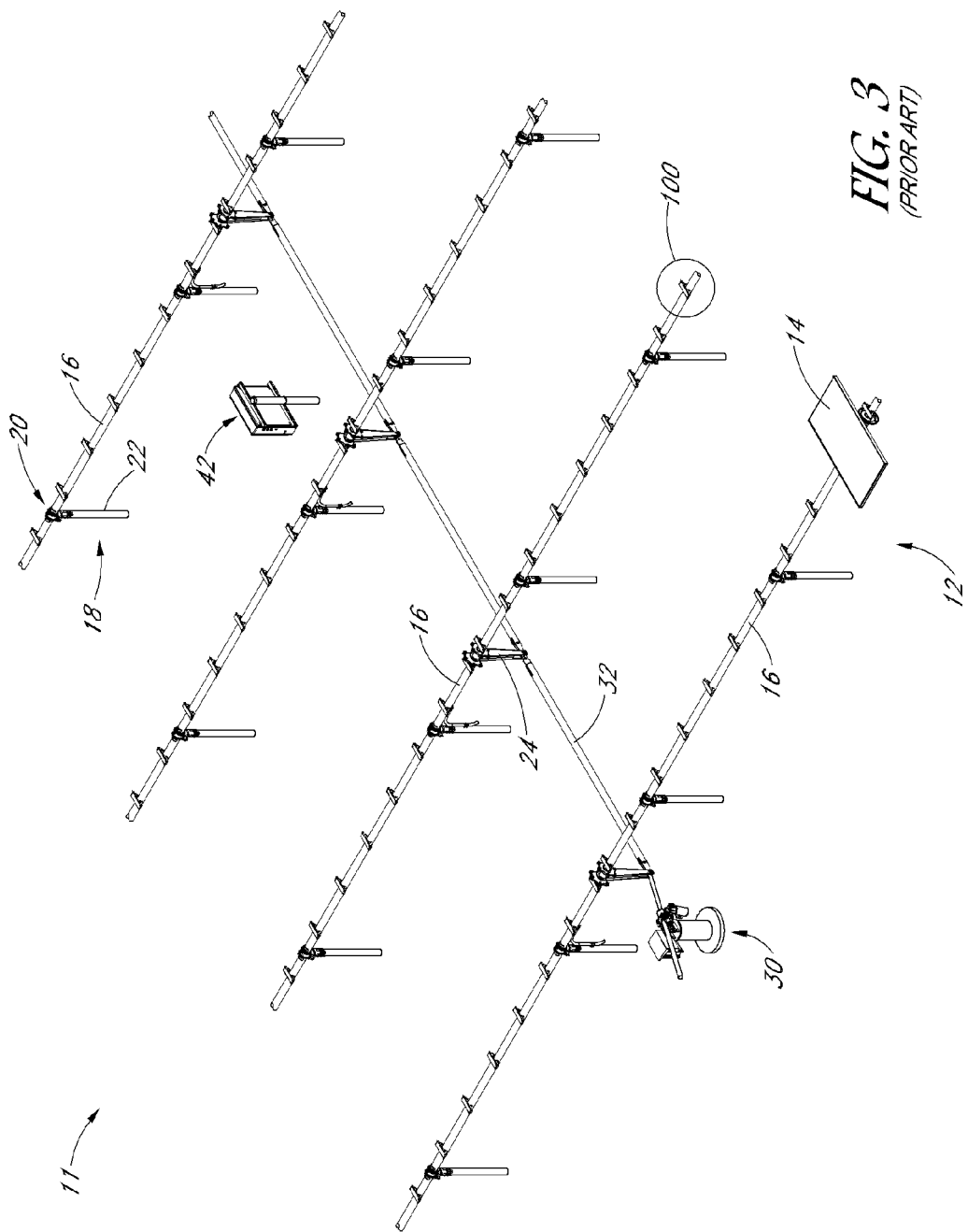
FIG. 3 is a perspective view of the solar collection system of FIG. 1, illustrating a plurality of piles mounted to the ground and supporting a plurality of torque tubes with a sun-tracking drive in accordance with an embodiment.
Figure 8:
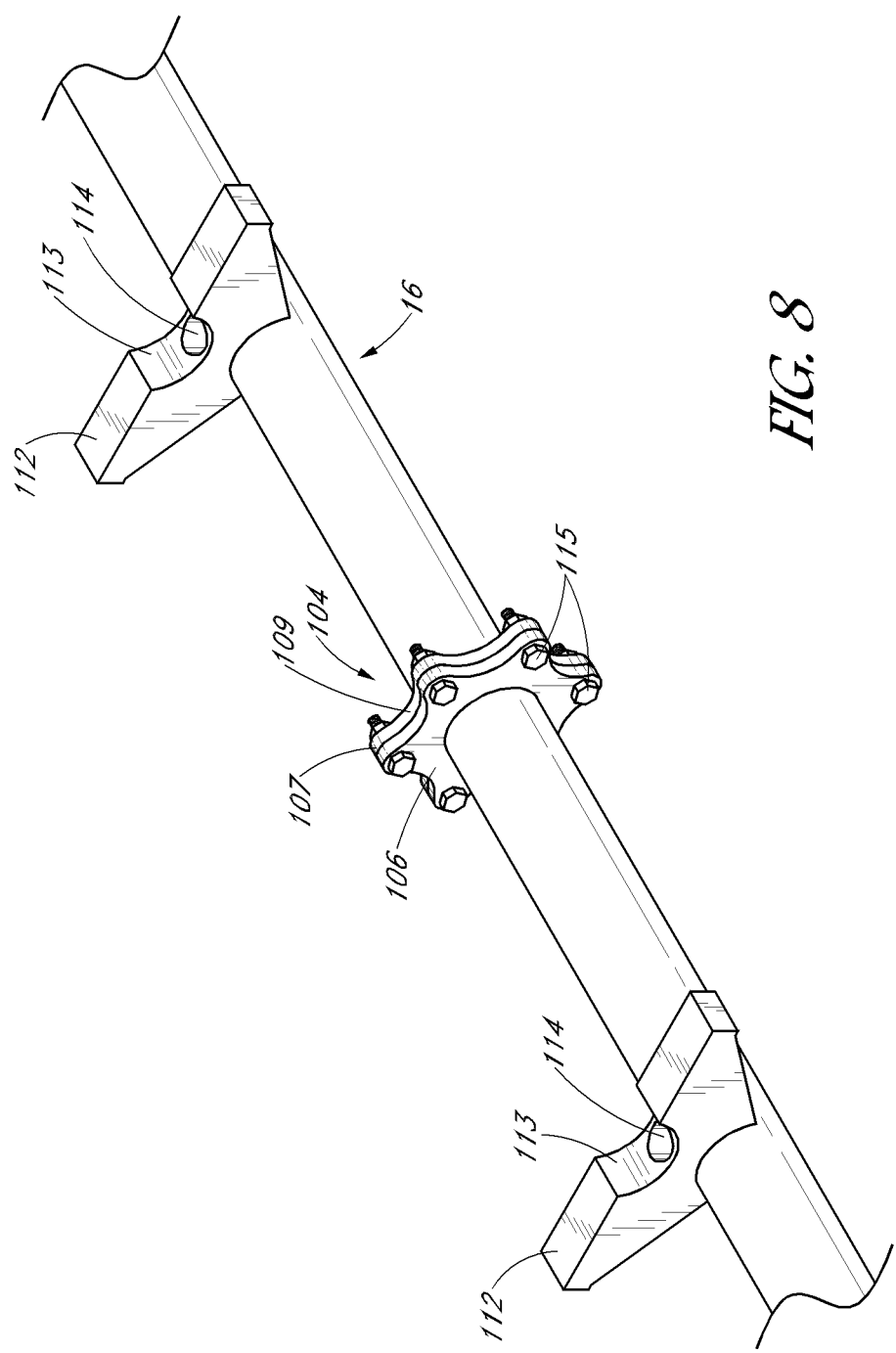
FIG. 8 is a perspective view of the torque tube illustrated in FIG. 5 connected to another torque tube and with photovoltaic modules supported on either side of the coupling flanges of the two torque tubes.

In the description set forth below, an example of a prior art is shown in FIGS. 1-3 to illustrate a solar energy collection system 10 in the context of being formed by a plurality of solar collector devices, supported by torque tubes so as to be pivotally adjustable for sun-tracking purposes. Embodiments of the current invention described below include torque tubes with features in solar collector device support and torque transmission members with reference to FIGS. 4-9, can be used with the solar collection system 10 illustrated in FIGS. 1-3, as well as the variations and equivalents thereof.

FIG. 1 illustrates the solar collection system 10, which can be considered an electricity farm. The solar collection system 10 includes a solar collector array 11 which includes a plurality of solar collection modules 12. Each of the solar collection modules 12 can include one or a plurality of solar collecting devices 14 supported by a drive shaft or torque tube 16. Each of the torque tubes 16 are supported above the ground by a support assembly 18, and can be bolted to, or mechanically linked to each other, by coupling flange 20 located on at least one end of the torque tube 16.

With continued reference to FIG. 1, the system 10 can also include a tracking drive 30 connected to the torque tube 16 and configured to pivot the torque tube 16 so as to cause the collector devices 14 to track the movement of the sun. In the illustrated embodiment, the torque tubes 16 are arranged generally horizontally and the modules 12 are connected to each other, as more fully described in U.S. patent application Ser. No. 13/176,276, filed Jul. 5, 2011, the entire contents of which is hereby expressly incorporated by reference. However, inventions disclosed herein can be used in the context of other types of arrangements. For example, the system 10 can include a plurality of modules 12 that are arranged such that the torque tube 16 is inclined relative to horizontal, wherein the torque tubes 16 are not connected in an end to end fashion, such as the arrangement illustrated and disclosed in U.S. Patent Publication No. 2008/0245360. The entire contents of the 2008/0245360 patent publication, as well as the entire contents of the U.S. patent application Ser. No. 13/631,782 are hereby expressly incorporated by reference. Further, the inventions disclosed herein can be used in conjunction with the systems that provide for controlled tilting about two axes.

The solar collection devices 14 can be in the form of photovoltaic panels, thermal solar collection devices, concentrated photovoltaic devices, or concentrated thermal solar collection devices. In the illustrated embodiment, the solar collection devices 14 are in the form of non-concentrated, photovoltaic modules. The photovoltaic modules can include one or more photovoltaic cells, encased in a frame assembly including an optically transparent upper cover and a peripheral frame.

With reference to FIG. 2, solar collection system 10 can further include an electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which is hereby expressly incorporated by reference. Other electrical systems can also be used.

FIG. 3 illustrates the array 11 with all but one of the solar collection devices 14 removed. As shown in FIG. 3, each of the support assemblies 18 includes the bearing 20 supported at the upper end of a pile 22. The torque tube 16 can be of any length and can be formed in one or more pieces. The spacing of the piles 22, relative to one another, can be determined based on the desired limits on deflection of the torque tubes 16 between the support structures 18, wind loads, and other factors.

The tilt drive 30 can include a drive strut 32 coupled with the torque tube 16 in a way that pivots the torque tube 16 as the drive strut 32 is moved axially along its length. The drive strut 32 can be connected with the torque tube 16 with torque arm assemblies 34. In the illustrated embodiment, the torque arm assemblies 34 disposed at an end of each of the torque tube 16. Also illustrated in FIG. 3 is an embodiment of a torque tube connection arrangement 100.

A detailed perspective view of an embodiment of a torque tube assembly is shown in FIG. 4, with the torque tube 16 disconnected from any another torque tube and with the solar module 14 removed for clarity.

In some embodiments, optionally, the torque tube 16 can be configured to allow plural torque tubes to nest with each other and thus rest stably upon each other in a stacked configuration for stockpiling, shipping and/or transport. Such nesting can reduce a need for packing material.

The torque tube 16 can have a solid or cylindrical body, extending along a longitudinal axis L. The cylindrical body can have any cross-sectional shape, including but without limitation, round, square, triangular, rectangular, polygonal, or other shapes. Thus, as used herein, the term "cylindrical" includes a surface or solid bounded by two parallel planes and generated by a straight line moving parallel to the given planes and tracing a closed shape with any number of curved and/or straight segments, bounded by the planes and lying in a plane perpendicular or oblique to the given planes.

The coupling flange 104, which can be considered to serve as a torque transmission member, can include a mounting portion 106 configured for fixation to a rotatable shaft, such as the torque tube 16. For example, in some embodiments, the mounting portion 106 can be configured for welding to an end of the torque tube 16. Conversely, the torque tube 16 can be configured for fixation to the flange 104, for example, by preparing an end of the body of the torque tube 16 for welding to the flange 104. In some embodiments, the flange 104 is formed from a single piece of material forming a single monolithic member. In some embodiments, the flange 104 can be formed by stamping. Other fastening techniques and configurations of the mounting portion 106 and torque tube ends can also be used. Positioned as illustrated in FIG. 4. the longitudinal axis L also defines a central axis of the flange 104.

The flange 104 can also include one or more radially extending projections. For example, the flange 14 can include lobes 107 extending radially outwardly away from the longitudinal axis L.

In at least one embodiment, the lobes 107 can have a tapering width with increasing radial distance outwards away from the longitudinal axis L. Optionally, at least one concave portion 109 can be disposed between adjacent lobes 107. The concave portion 109 can include a concave surface facing outwardly away from the longitudinal axis L and formed with one or more curved segments, flat facets, or any combination of curved and flat segments or facets. In some embodiments, the concave surface extends along a single radius of curvature. Optionally, the radius of curvature of the concave surface can be approximately the same as or at least as large as a radius of curvature of the outer surface of the cylindrical body of the torque tube 16.

FIG. 4 also illustrates the bolt holes 105 extending through each lobe of the torque tube coupling flange 104 and a saddle mount solar collector device support 112 in close proximity to the flange 104. In at least one embodiment, the bolt holes 105 are equidistant radially from the center of the torque tube 16, and are also spaced apart from each other with equal distance.

In some embodiments, the saddle mount 112 can also have a concave portion 113. Similarly to the concave portion 109, the concave portion 113 can follow a single radius of curvature or can include any combination of curved and flat segments or facets. The saddle mount 112 may be welded to the outer surface of the torque tube 16. In other embodiments, the saddle mount 112 can include a hole 114 to facilitate mechanical attachment to the torque tube. An enlarged side view of the same connection arrangement 100 presented in FIG. 4 is shown in FIG. 5.

Figure 9:
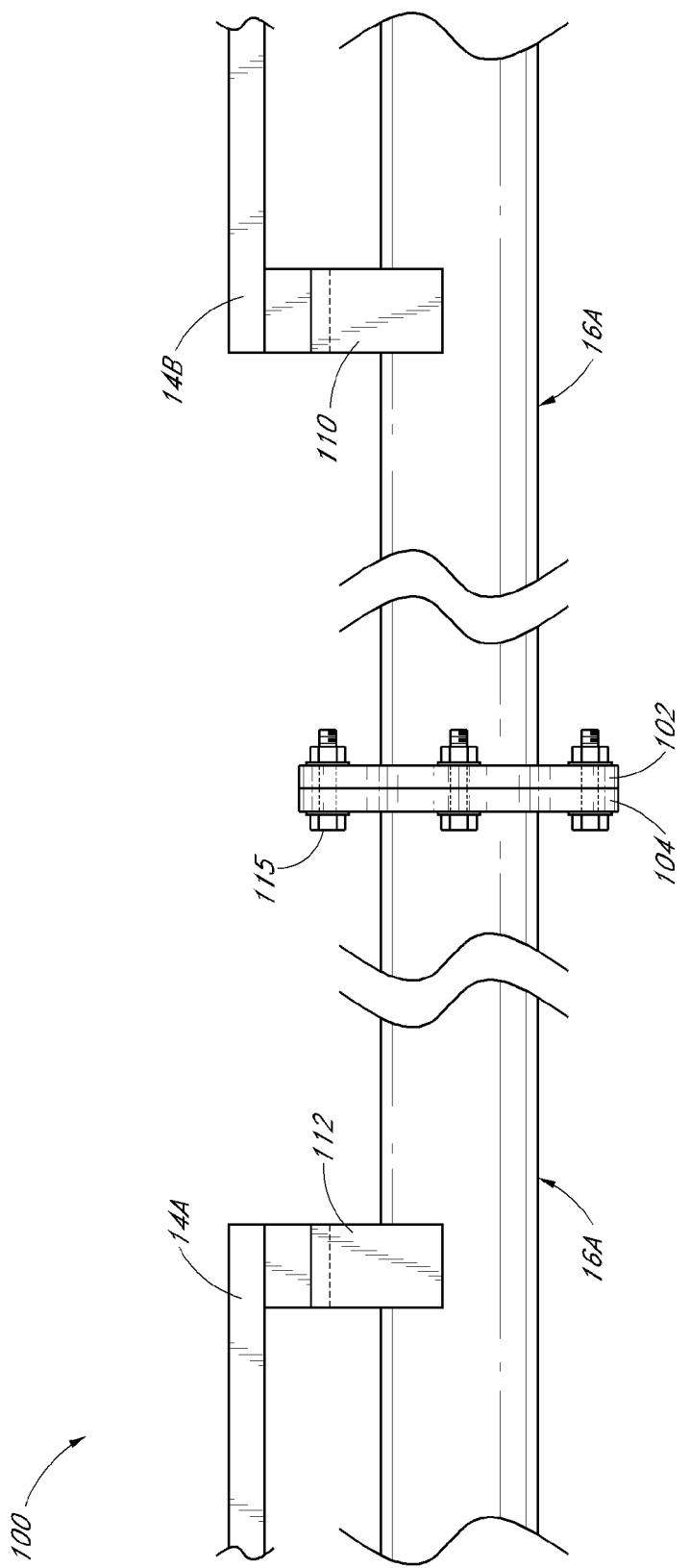
FIG. 9 is a side elevational view of the torque tube illustrated in FIG. 5 connected to another torque tube and with photovoltaic modules supported on either side of the coupling flanges of the two torque tubes.

FIG. 9 illustrates a connection arrangement 100 with two torque tubes coupled together, in an end-to-end fashion. A torque tube 16A disposed on the left side of FIG. 6 is connected to a torque tube 16B disposed on the right side of FIG. 6. Each of the torque tubes includes a coupling flange 102, 104. Each of the coupling flanges 102, 104 are welded to their respective torque tubes 16A, 16B. Additionally, the coupling flanges 102, 104 are connected to each other by fasteners, such as for example, nuts and bolts extending through aligned bolt holes (not shown) of the flanges 102, 104.

FIG. 9 also shows each of the torque tubes 16A, 16B including saddle mount solar collector device supports 110, 112. In at least one embodiment, solar collecting devices 14A, 14B are mounted with the periphery of the modules supported from underneath by the saddle mount, as shown in FIG. 6.

Figure 11:
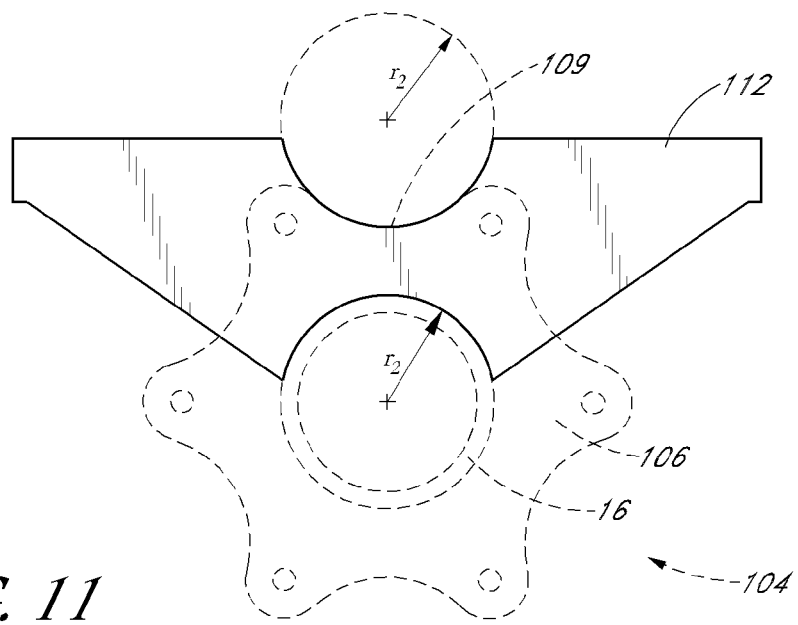
FIG. 11 is an end view of the coupling flange of FIG. 8, with a second torque tube nested in the lobed coupling flange and the saddle mount solar collector device support.

FIG. 11 illustrates an optional nesting arrangement. In at least one embodiment, the concave portions in the coupling flange 104 and the saddle mount solar collector device support 112 can have a radius of at least the radius of the circular cross-section of the cylindrical body 15 of the torque tube 16, thus allowing for the torque tubes to rest upon each other during shipping and transport with improved packing density. In other embodiments, for example using torque tubes with a rectangular or other cross-section, the concave portions can include flat portions and or plural curved portions arranged to abut against flat portions of the outer surface of rectangular or other cross section torque tubes.

Figure 10:
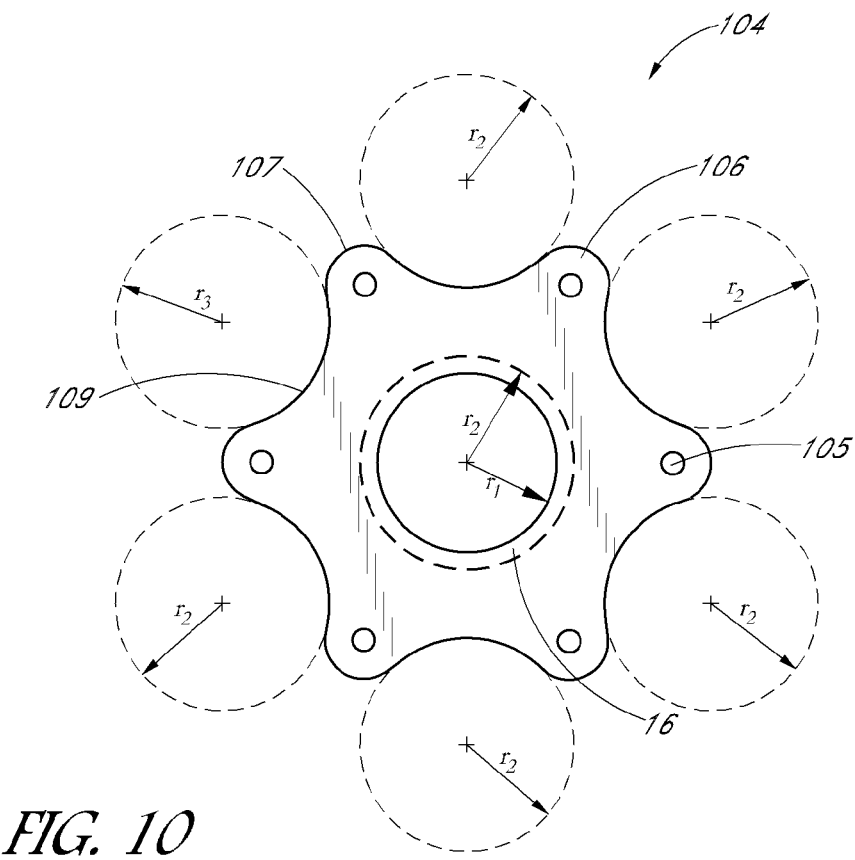
FIG. 10 is an end view of the coupling flange of FIG. 8, with a plurality of torque tubes nested with the lobes in the coupling flange.

FIG. 10 is an end view of the coupling flange 104, illustrating the radius r2 of the cylindrical body of the torque tube 16 and also the radii of curvatures of the outward-facing concave portions extending between and connecting each adjacent lobe. In the embodiment shown, the outer radius of the cylindrical body of the torque tube r2 is slightly greater than the radius r1, being the inner radius of the cylindrical body and also of the circular opening at the center of the coupling flange 104. Also shown in FIG. 10, in some embodiments the radii of curvatures r2, r3 of the outward-facing concave portions extending between and connecting each adjacent lobe can be of different values. In other embodiments, the radii r2, r3 of each of the concave portions can be equivalent, and equal to the outer radius of the cylindrical body of the torque tube 16.

FIG. 11 shows a nesting arrangement of torque tubes 16 with the coupling flange 104 aligned with the saddle mount 112. In this embodiment, the radius r2 of the concave portion in the saddle mount and the top concave portion of the coupling flange are aligned such that another torque tube having outer radius r2 may be nested on top of torque tube 16, nesting in both a concave portion of the flange 104 and the concave portion of the saddle mount 112.

Figure 12:
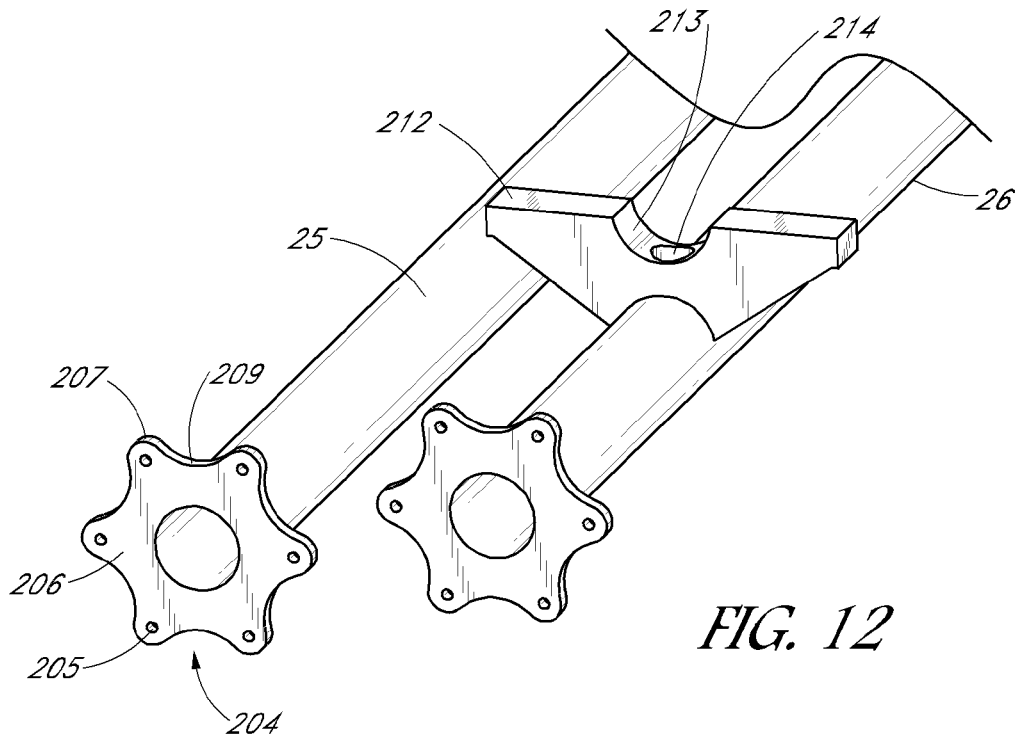
FIGS. 12-14 are perspective views illustrating sequential stacking of torque tubes in a nesting configuration.
Figure 13:
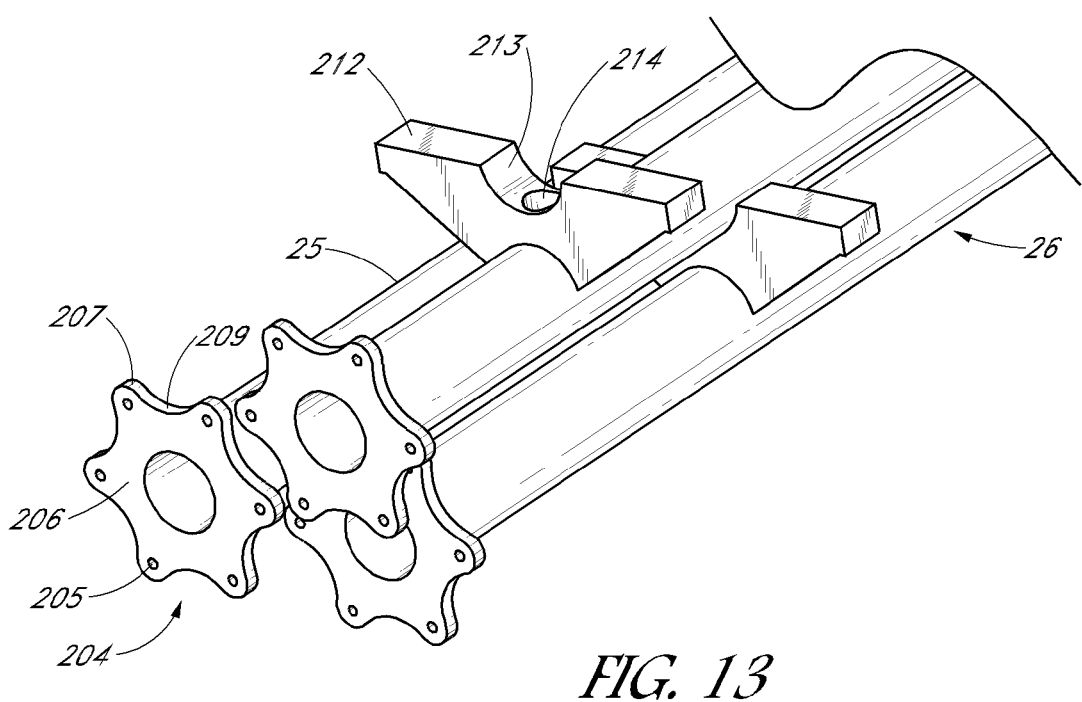
Figure 14:
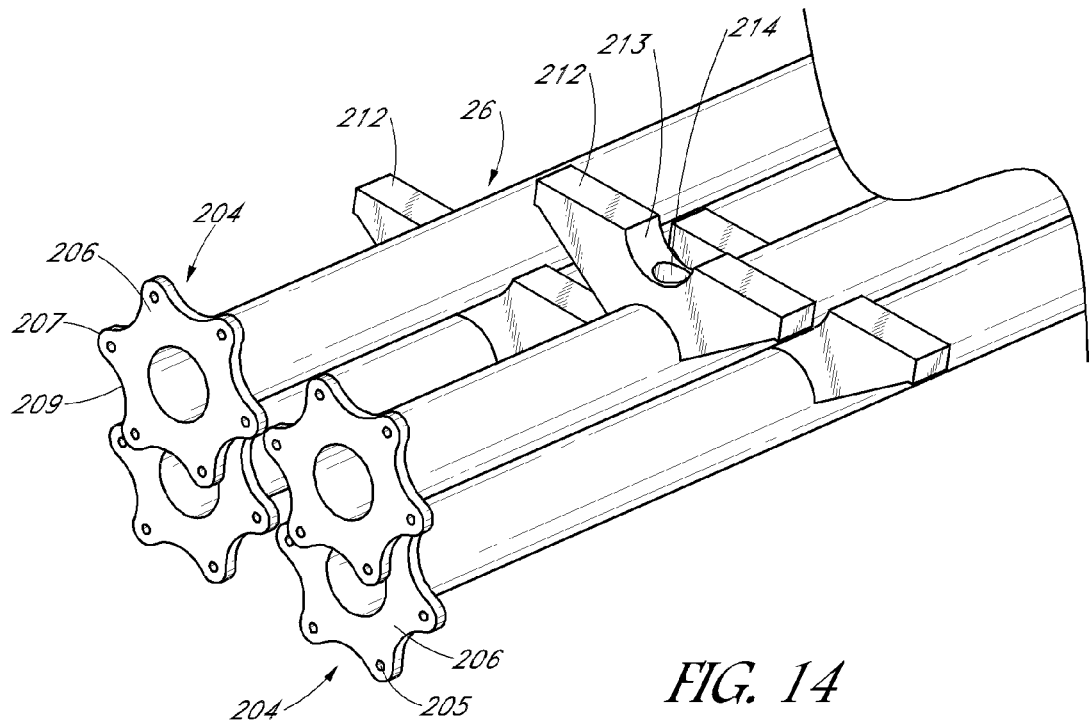
Figure 15:
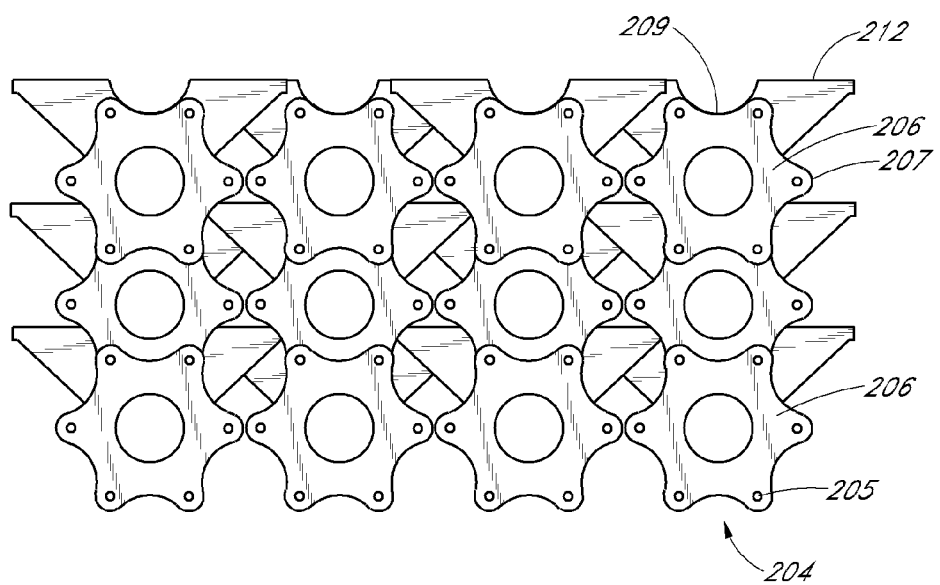
FIG. 15 is an end view of a nesting configuration of a plurality of stacked torque tubes in accordance with an embodiment.
Figure 16:
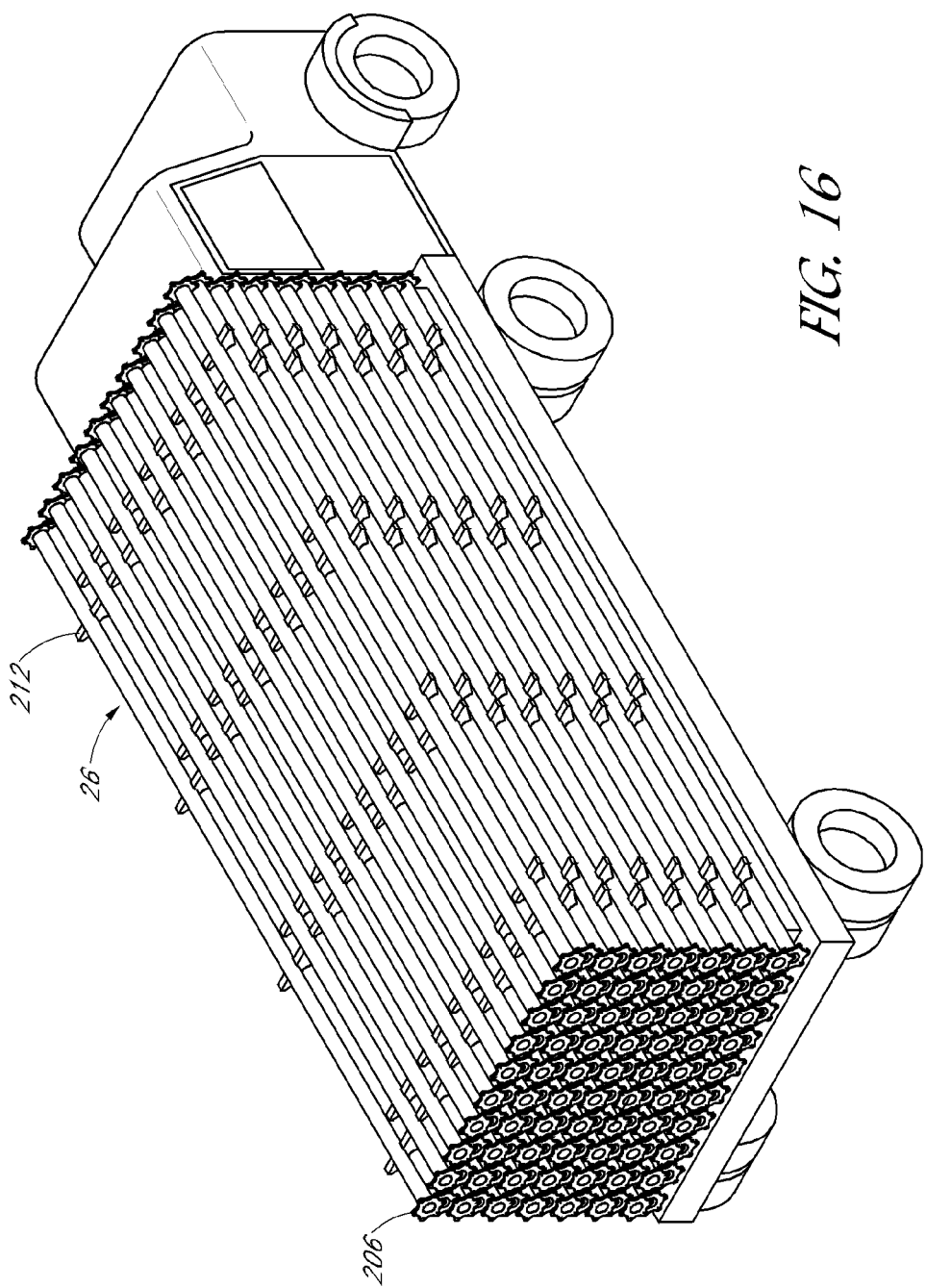
FIG. 16 is a perspective view of the nesting configuration of FIG. 15 mounted on a flatbed truck for transportation.

FIGS. 12-14 illustrate how the nesting features described above with reference to FIG. 11 can be included on two or more torque tubes, each of which having coupling flanges on both ends and having at least one saddle mount. In the illustrated embodiment, each torque tube 16 can be nested against at least one other torque tube and as many as six other torque tubes 16 (see FIG. 10) to form a stacking arrangement in preparation for storage or transportation. When packaged for shipping in conformance with maximum allowable shipping dimensions, the above-described embodiments can provide improved shipping density and reduce or eliminate the need for additional packing material. An end view of the stacking arrangement of an optional embodiment of nested torque tubes is shown in FIG. 15. FIG. 16 shows a perspective view of the same stacking arrangement as supported on a flatbed truck ready for transport.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A torque transmission member comprising:
   a rotatable shaft extending along a longitudinal axis and having a first radius of curvature of an outer surface thereof;
   a mounting portion fixed to an end of the rotatable shaft and configured for transmission of rotational force around the longitudinal axis of the rotatable shaft;
   at least six lobes extending radially outwardly away from the mounting portion and away from a central axis of the torque transmission member, the plurality of lobes being distributed around the circumferentially extending portion, each of the lobes having a hole; and
   at least six concave portions disposed between respective adjacent pairs of lobes; wherein each of the at least six concave portions comprises a concave surface facing outwardly away from the central axis, the concave surface having a second radius of curvature, wherein the second radius of curvature is approximately the same as the first radius of curvature.

2. The torque transmission member of claim 1, wherein each of the at least six lobes has a tapering width with increasing distance from the center of the central region.

3. The torque transmission member of claim 2, wherein each of the at least six lobes has a rounded end.

4. The torque transmission member of claim 3, wherein each of the rounded ends has a radius of curvature centered in the hole in each of the respective lobes.

5. The torque transmission member of claim 1, wherein the plurality of lobes are equally spaced around the circumferentially extending portion.

6. The torque transmission member of claim 1, wherein the torque transmission member is substantially planar.

7. A torque tube comprising:
   a unitary cylindrical body extending along a longitudinal axis, the cylindrical body having a first cross sectional shape and first and second ends;
   a torque transmission member fixed to the first end of the unitary cylindrical body, the torque transmission member comprising a plurality of lobes extending radially outwardly relative to the longitudinal axis, each of the plurality of lobes including a hole extending therethrough, and a plurality of concave portions disposed between adjacent lobes; and
   a saddle mount fixed relative to an outer surface of the unitary cylindrical body at a position between the torque transmission member and the second end and extending generally transverse to the longitudinal axis, the saddle mount comprising:
      a lower surface secured to the outer surface of the unitary cylindrical body,
      a planar upper surface spaced apart from the lower surface, and
      a concave portion formed in the planar upper surface, wherein at least one of the concave portions of the torque transmission member is aligned with the concave portion of the saddle mount.

8. The torque tube of claim 7, wherein the concave portion of the saddle mount faces away from the unitary cylindrical body.

9. The torque tube of claim 8, wherein the concave portion of the saddle mount has a contoured region, the contoured region comprising a circular shape with a radius of curvature substantially equal to a radius of curvature of an outer surface of the unitary cylindrical body.

10. The torque tube of claim 7, wherein the torque transmission member has a substantially smooth surface on a vertical face which extends perpendicular to the longitudinal axis of the unitary cylindrical body.

11. The torque tube of claim 7, wherein the unitary cylindrical body comprises a substantially circular cross sectional shape, and wherein each of the plurality of lobes include holes radially equidistant from a center of the substantially circular cross sectional shape of the unitary cylindrical body.

12. The torque tube of claim 11, wherein each of the plurality of lobes has a radius of curvature centered in the hole in each of the respective lobes.

13. The torque tube of claim 11, wherein the concave portions of the torque transmission member comprise a substantially smooth surface extending along a radius of curvature that is the same as the radius of curvature as the outer surface of the unitary cylindrical body.

14. The torque tube of claim 7, the lower surface comprising a hole therethrough, and further comprising a bolt securing the saddle mount to the unitary cylindrical body via the hole in the lower surface of the saddle mount.

15. The torque tube of claim 7, wherein an outer edge of two of the plurality of lobes on either side of one of the concave portions of the torque transmission member aligned with the concave portion of the saddle mount extend a first distance away from the outer surface of the unitary cylindrical body that is less than a second distance, the second distance between the outer surface of the unitary cylindrical body and the planar upper surface.

16. A plurality of stacked torque tubes, comprising:
   a first torque tube comprising a first cylindrical body having a first outer surface, extending along a first longitudinal axis between first and second ends, and having a first circular cross sectional shape;
   at least one saddle mount fixed on the first cylindrical body between the first and second ends, the saddle mount comprising a first mounting surface extending outwardly from the first cylindrical body in a first direction transverse to the longitudinal axis of the first cylindrical body, a second mounting surface extending outwardly from the first cylindrical body in a second direction transverse to the longitudinal axis of the first cylindrical body and opposite to the first direction, and a lower surface secured to the outer surface of the first torque tube;
   wherein the saddle mount further comprises a concave portion disposed between the first and second mounting surfaces, the concave portion facing radially outwardly from the longitudinal axis;
   a torque transmission member fixed to the first end of the first cylindrical body, the torque transmission member comprising a plurality of outwardly extending projections which extend in a direction away from the longitudinal axis, each of the plurality of outwardly extending projections having a hole extending therethrough; and
   wherein the torque transmission member further comprises at least one concave portion disposed between two adjacent outwardly extending projections, the concave portion of the torque transmission member being aligned with the concave portion of the saddle mount; and a second torque tube comprising a second cylindrical body extending along a second longitudinal axis and having a second outer surface, the second cylindrical body being stacked on the first torque tube such that the second longitudinal axis is generally parallel to the first longitudinal axis and the second outer surface contacts and is supported by both the concave portion of the torque transmission member and the concave portion of the saddle mount.

17. The plurality of stacked torque tubes of claim 16, wherein the second outer surface extends along a first radius of curvature, wherein the concave portion of the torque transmission member and the concave portion of the saddle mount extend along a radius of curvature that is substantially equal to the first radius of curvature.

18. The nested arrangement of a plurality of torque tubes of claim 16, wherein the second torque tube comprises a second saddle mount having a second concave portion facing away from the second longitudinal axis, the first outer surface of the first cylindrical body contacting the second concave portion.

* * * * *